(12) United States Patent
Lin et al.

(10) Patent No.: US 8,084,517 B2
(45) Date of Patent: Dec. 27, 2011

(54) ADDITION OF POLAR POLYMER TO IMPROVE TEAR STRENGTH AND PROCESSING OF SILICA FILLED RUBBER

(75) Inventors: Chen-Chy Lin, Hudson, OH (US); William L. Hergenrother, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 801 days.

(21) Appl. No.: 11/339,129

(22) Filed: Jan. 25, 2006

(65) Prior Publication Data

US 2006/0122315 A1    Jun. 8, 2006

Related U.S. Application Data

(63) Continuation of application No. 10/124,055, filed on Apr. 17, 2002, now Pat. No. 7,041,745.

(51) Int. Cl.
*C08J 3/20* (2006.01)
*C08J 9/04* (2006.01)
*C08K 3/36* (2006.01)

(52) U.S. Cl. ......... 523/351; 523/216; 524/492; 524/495

(58) Field of Classification Search .................. 523/492, 523/495, 216, 351; 524/492, 495
See application file for complete search history.

(56) References Cited

U.S. PATENT DOCUMENTS

| | | | |
|---|---|---|---|
| 2,986,544 A * | 5/1961 | Driscoll ........................ 524/524 |
| 3,856,723 A | 12/1974 | Vrisakis et al. |
| 5,317,051 A | 5/1994 | Harashige et al. |
| 5,714,533 A | 2/1998 | Hatakeyama et al. |
| 5,717,022 A | 2/1998 | Beckmann et al. |
| 5,798,009 A | 8/1998 | Teratani |
| 6,191,205 B1 | 2/2001 | Micouin et al. |
| 6,202,726 B1 | 3/2001 | Corvasce et al. |
| 6,221,943 B1 | 4/2001 | Hergenrother et al. |
| 6,228,908 B1 | 5/2001 | Takeichi et al. |
| 6,245,860 B1 | 6/2001 | Materne et al. |
| 6,252,007 B1 | 6/2001 | Oziomek et al. |
| 6,255,372 B1 | 7/2001 | Lin et al. |
| 6,269,858 B1 | 8/2001 | Sandstrom |
| 6,273,163 B1 | 8/2001 | Materne et al. |
| 6,274,676 B1 | 8/2001 | Lin et al. |
| 6,313,210 B1 | 11/2001 | Lin et al. |
| 6,342,552 B1 | 1/2002 | Hergenrother et al. |
| 6,348,531 B1 | 2/2002 | Hergenrother et al. |
| 6,369,138 B2 | 4/2002 | Hergenrother et al. |

* cited by examiner

*Primary Examiner* — Tae H Yoon

(57) ABSTRACT

A vulcanizable rubber composition is provided that comprises an elastomer, a reinforcing filler comprising silica or a mixture thereof with carbon black, a silica dispersing aid comprising about 0.1 to about 15 phr poly(vinyl acetate) (PVA), and a cure agent. The addition of PVA to the composition improves the processability of the compound, improves the tear strength and modulus of the rubber and can reduce the number of mixing stages during compounding, resulting in lowering of the cost of operation and increasing plant productivity without compromising the processability or other physical properties of the stocks. Also provided are a vulcanizate formed from vulcanizing the rubber composition, a tire component formed from the vulcanized rubber and a process for forming the tire component.

3 Claims, No Drawings

ADDITION OF POLAR POLYMER TO IMPROVE TEAR STRENGTH AND PROCESSING OF SILICA FILLED RUBBER

CROSS-REFERENCE

This application is a Continuation application of U.S. Ser. No. 10/124,055, filed Apr. 17, 2002 now U.S. Pat. No. 7,041, 745.

FIELD OF THE INVENTION

The invention generally relates to vulcanizable elastomeric compounds containing silica as a reinforcing filler.

BACKGROUND OF THE INVENTION

When producing elastomeric compositions for use in rubber articles, such as tires, power belts, and the like, it is desirable that these elastomeric compositions are easily processable during compounding and have a high molecular weight with a controlled molecular weight distribution, glass transition temperature ($T_g$) and vinyl content. It is also desirable that reinforcing fillers, such as silica and/or carbon black, be well dispersed throughout the rubber in order to improve various physical properties, such as the compound Mooney viscosity, elastic modulus, tangent delta (tan δ), and the like. Rubber articles, especially tires, produced from vulcanized elastomers exhibiting these improved properties will have reduced hysteresis, better rolling resistance, snow and ice traction, wet traction, tread wear and improved fuel economy for vehicles equipped with such tires.

When silica is employed as a reinforcing filler for rubber, filler dispersion in rubber stocks is a concern. Because polar silanol groups on the surface of silica particles tend to self-associate, reagglomeration of silica particles can occur after compounding, leading to poor silica dispersion and a high compound viscosity. The strong silica filler network results in a rigid uncured compound that is difficult to process in extrusion and forming operations. Previous attempts at preparing readily processable, vulcanizable silica-filled rubber stocks have focused on the use, during compounding, of bifunctional silica coupling agents having a moiety (e.g., an alkoxysilyl group) reactive with the silica surface and a moiety (e.g., a mercapto, vinyl, methacroyl or sulfide group) that binds to the elastomer. Well known examples of such silica coupling agents are mercaptosilanes, bis(trialkoxysilylorgano) polysulfides, such as bis(3-triethoxysilylpropyl) tetrasulfide (TESPT) and bis(3-triethoxysilylpropyl) disulfide (TESPD), and 3-thiocyanatopropyl trimethoxysilane. These bifunctional silica coupling agents offer excellent coupling between rubber and silica, resulting in rubbers having improved wet ice skid resistance, rolling resistance and tread wear.

However, there are disadvantages to the use of bifunctional silica coupling agents. For example, the high chemical reactivity of the —SH functions of the mercaptosilanes with organic polymers can lead to unacceptably high viscosities during processing and to premature curing (scorch). The tendency of a rubber compound to scorch makes compounding and processing more difficult. Mixing and milling must be done more quickly, yet at lower temperatures (e.g., 120° C. to 145° C.), so that the compound will not begin to vulcanize before it is shaped or molded. Rubber compounds employing TESPT must be mixed at a temperature below 165° C., if an irreversible thermal degradation of the polysulfide function of the coupling agent and premature curing of the mixture are to be avoided. The upper processing temperature limitations of such bifunctional silica coupling agents result in a marked reduction in the mechanical activity of mixing which is essential for an optimum dispersion of the silica throughout the polymer matrix. Therefore, compared with carbon black-filled compositions, tread compounds having good silica dispersion require a longer mixing time at a lower temperature to achieve improved performance, resulting in decreased production and increased expense.

Recent approaches to improving dispersion of silica in rubber compounds have been directed to reducing or replacing the use of silica coupling agents by employing silica dispersing aids, such as monofunctional silica shielding agents (e.g., silica hydrophobating agents that chemically react with the surface silanol groups on the silica particles but are not reactive with the elastomer) and agents which physically shield the silanol groups, to prevent reagglomeration of the silica particles after compounding. For example, silica dispersing aids, such as alkylalkoxysilanes, glycols (e.g., diethylene glycol or polyethylene glycol), fatty acid esters of hydrogenated and non-hydrogenated $C_5$ and $C_6$ sugars (e.g., sorbitan oleates, and the like), polyoxyethylene derivatives of the fatty acid esters have been found to reduce compound viscosity, increase scorch times and reduce silica reagglomeration. Such silica dispersing aids can be used to replace all or part of the bifunctional silica coupling agents, while improving the processability of silica-filled rubber compounds. However, there is an ongoing need to provide alternative silica dispersing aids that improve properties of rubber compounds and of the tire treads and other tire components employing them.

SUMMARY OF THE INVENTION

It has been discovered that the polar additive poly(vinyl acetate) (PVA) improves the processability of silica-reinforced rubber compounds by reducing the compound Mooney viscosity, prolonging the scorch time and reducing silica reagglomeration. Surprisingly, it has also been discovered that when PVA is included in the rubber compounding mixture, the number of mixing stages can be reduced, resulting in lowering of the cost of operation and increasing plant productivity without compromising the processability of the stocks.

It has also been discovered unexpectedly that compounds with added PVA have improved tear strength compared to compounds not containing PVA. Improved tear strength is an advantageous property, especially during release of cured rubbers from a hot mold during the vulcanization process. PVA-containing rubber stocks also have improved dynamic viscoelastic modulus properties that are indicative of improved handling of vehicles equipped with tires having treads manufactured from these stocks.

Moreover, the addition of the PVA to the rubber stocks provides the foregoing advantages without sacrificing other tensile and viscoelastic properties of the rubber vulcanizates that provide favorable wet and snow traction and rolling resistance of tires made with the stocks.

In general, a vulcanizable rubber composition is provided that comprises an elastomer, a reinforcing filler comprising silica or a mixture thereof with carbon black, a silica dispersing aid comprising about 0.1 to about 15 phr PVA, and a cure agent. The abbreviation phr means parts per hundred parts of the elastomer, and the terms elastomer, polymer and rubber are used interchangeably herein, as is customary in the rubber industry. Also provided are a vulcanizate formed from vulcanizing the rubber composition, a tire component formed from the vulcanized rubber and a process for forming the tire component.

DETAILED DESCRIPTION OF THE INVENTION

Poly(vinyl acetate) is an amorphous compound having a broad molecular weight distribution that is often used as an aqueous emulsion in water-based paints and adhesives. When dried, the PVA forms a hard insoluble film. Unexpectedly, it has been discovered that PVA can be used as a silica shielding agent in compounding rubber. That is, the polar ester groups presented by the PVA can interact with the silanol groups on the surface of the silica filler during compounding to form a thin monolayer on the silica surface. Because of the silica shielding effect of the PVA, reagglomeration of the silica particles is prevented or significantly decreased. As a result, the Mooney viscosity of the compound is reduced, providing desirable improvements in the processability of the compound during operations such as extrusion and filling of the mold prior to cure of the rubber. Moreover, the compounds containing PVA have longer scorch times and faster curing rates.

Thus, in one embodiment of the invention, a vulcanizable rubber composition is provided that comprises an elastomer, a reinforcing filler comprising silica or a mixture thereof with carbon black, a silica dispersing aid comprising about 0.1 to about 15 phr of PVA, and a cure agent.

In another embodiment of the invention, a vulcanizate comprising the vulcanizable rubber composition is obtained by vulcanization of the vulcanizable rubber composition with at least one vulcanizing agent, as described below.

In another embodiment of the invention, a tire is provided that includes at least one component comprising the vulcanizate obtained by vulcanization of the rubber composition. It has been found that the addition of PVA to vulcanizable rubber compositions provides vulcanizates for tire treads and other tire components that have increased tear strength and toughness and improved modulus for better vehicle handling, without substantially affecting other mechanical, wear and hysteresis properties of the rubber. Accordingly the present invention may be applied to treads, sidewalls, belts, carcasses, or any other tire components, especially those in which good tear strength is desirable. Moreover, the rubbers made according to the present invention can be used for tire treads and other tire components for all types of tires including, but not limited to, passenger tires, off-road tires, heavy-duty truck tires, and the like.

In another embodiment of the invention, a process is provided for forming a tire component comprising the steps of (a) blending together an elastomer, a reinforcing filler comprising silica or a mixture thereof with carbon black, a silica dispersing aid comprising about 0.1 to about 15 phr of PVA, and a cure agent, to form a tire compound; (b) vulcanizing the tire compound; and (c) fabricating the tire compound into a tire component.

PVA of any molecular weight and polydispersity may be employed in the embodiments of the invention. Indeed, the molecular weights and polydispersity of commercially available PVAs vary. It is preferred, however, that the weight average molecular weight of the PVA employed in this invention be from about 80,000 to about 500,000, preferably from about 90,000 to about 400,000, and even more preferably from about 100,000 to about 350,000, as determined by using standard GPC analysis with polystyrene as a standard. For example, a suitable PVA having a molecular weight of 140,000 is available commercially from Aldrich Chemical Company, Milwaukee, Wis.

The PVA may be present in the vulcanizable rubber compositions according to the invention in an amount of about 0.1 to about 15 phr, preferably about 0.5 to about 10 phr or, in some cases, about one to about 8 phr. It has been found that the thinner the layer of PVA on the silica surface, the better is the bonding of the PVA to the silica.

The present invention can be used in conjunction with any solution polymerizable or emulsion polymerizable elastomer. Solution and emulsion polymerization techniques are well known to those of ordinary skill in the art. For example, conjugated diene monomers, monovinyl aromatic monomers, triene monomers, and the like, can be anionically polymerized to form conjugated diene polymers, or copolymers or terpolymers of conjugated diene monomers and monovinyl aromatic monomers (e.g., styrene, alpha methyl styrene and the like) and triene monomers. The elastomers that are typically employed within vulcanizable compositions that are useful for making tires and tire components include both natural and synthetic elastomers. For example, these elastomers include, without limitation, natural rubber, synthetic polyisoprene rubber, styrene/butadiene rubber (SBR), polybutadiene, butyl rubber, neoprene, ethylene/propylene rubber, ethylene/propylene diene rubber (EPDM), acrylonitrile/butadiene rubber (NBR), silicone rubber, fluoroelastomers, ethylene acrylic rubber, ethylene vinyl acetate copolymers (EVA) epichlorohydrin rubbers, chlorinated polyethylene rubber, chlorosulfonated polyethylene rubbers, hydrogenated nitrile rubber, tetrafluoroethylene/propylene rubber and the like. Preferred polymers for use in a vulcanized elastomeric compound of the invention include polyisoprene, polybutadiene, butadiene/isoprene copolymer, butadiene/isoprene/styrene terpolymer, isoprene/styrene copolymer, and styrene/butadiene copolymer. As used herein, the term elastomer or rubber will refer to a blend of synthetic and natural rubber, a blend of various synthetic rubbers, or simply one type of elastomer or rubber. When the preferred polymers are blended with conventional rubbers, the amounts can vary widely within a range comprising from about one to about 100 percent by weight of the total rubber, with the conventional rubber or rubbers making up the balance of the total rubber (100 parts).

The elastomers that are useful in practicing this invention include any of the various functionalized polymers that are conventionally employed in the art of making tires. For example, polymers can be terminally functionalized, or functionalized throughout the polymer backbone, such as with functional groups derived from an anionic polymerization initiator or a terminating or coupling agent. Preparation of functionalized polymers is well known to those skilled in the art. Exemplary methods and agents for functionalization of polymers are disclosed, for example, in U.S. Pat. Nos. 5,268,439, 5,496,940, 5,521,309 and 5,066,729, the disclosures of which are hereby incorporated by reference. For example, compounds that provide terminal functionality that are reactive with the polymer bound carbon-lithium moiety can be selected to provide a desired functional group. Examples of such compounds are alcohols, substituted aldimines, substituted ketimines, Michler's ketone, 1,3-dimethyl-2-imidazolidinone, 1-alkyl substituted pyrrolidinones, 1-aryl substituted pyrrolidonones, tin tetrachloride, tributyl tin chloride, carbon dioxide, and mixtures thereof. Other useful terminating agents can include those of the structural formula $(R)_a ZX_b$, where Z is tin or silicon, R is an alkyl having from about one to about 20 carbon atoms; a cycloalkyl having from about 3 to about 30 carbon atoms; and aryl having from about 6 to about 20 carbon atoms, or an aralkyl having from about 7 to about 20 carbon atoms. For example, R can include methyl, ethyl, n-butyl, neophyl, phenyl, cyclohexyl, or the like. X is a halogen, such as chlorine or bromine, or alkoxy (—OR), "a" is an integer from zero to 3, and "b" is an integer from one to 4, where a+b=4. Examples of such terminating agents include tin tetrachloride, tributyl tin chloride, butyl tin trichloride, butyl silicon trichloride, as well as tetraethoxysilane, $Si(OEt)_4$, and methyl triphenoxysilane, $MeSi(OPh)_3$. The practice of the present invention is not limited solely to polymers terminated with these agents, since other compounds that are reactive with the polymer bound carbon-lithium moiety can be selected to provide a desired functional group.

The elastomeric compositions of the invention are preferably compounded with reinforcing fillers, such as silica, or a mixture of silica and carbon black. Examples of suitable silica reinforcing filler include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. Among these, precipitated amorphous wet-process, hydrated silicas are preferred. These silicas are so-called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. For silicas of interest for the present invention, the surface area should be about 32 $m^2/g$ to about 400 $m^2/g$, with the range of about 100 $m^2/g$ to about 250 $m^2/g$ being preferred, and the range of about 150 $m^2/g$ to about 220 $m^2/g$ being most preferred. The pH of the silica filler is generally about 5.5 to about 7 or slightly over, preferably about 5.5 to about 6.8.

Silica can be employed in the amount of about one to about 100 parts by weight per hundred parts of the elastomer (phr), preferably in an amount of about five to about 80 phr and, more preferably, in an amount of about 30 to about 80 phr. The useful upper range is limited by the high viscosity imparted by fillers of this type. Some of the commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (e.g., VN2, VN3), Rhone Poulenc (e.g., Zeosil® 1165 MP), and J.M. Huber Corporation.

The elastomers can be compounded with all forms of carbon black in a mixture with the silica. The carbon black can be present in amounts ranging from about one to about 50 phr, with about five to about 35 phr being preferred. When both carbon black and silica are employed in combination as the reinforcing filler, they are often used in a carbon black-silica ratio of about 10:1 to about 1:10. The carbon blacks can include any of the commonly available, commercially-produced carbon blacks, but those having a surface area (EMSA) of at least 20 $m^2/g$ and, more preferably, at least 35 $m^2/g$ up to 200 $m^2/g$ or higher are preferred. Surface area values used in this application are determined by ASTM D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks can be used in preparing the carbon black products of the invention. Typical suitable carbon blacks are N-110, N-220, N-339, N-330, N-351, N-550, N-660, as designated by ASTM D-1765-82a. The carbon blacks utilized in the preparation of the vulcanizable elastomeric compositions of the invention can be in pelletized form or an unpelletized flocculent mass. Preferably, for more uniform mixing, unpelletized carbon black is preferred.

The elastomeric compounds of the invention can optionally further include a silica coupling agent such as, but not limited to, a mercaptosilane, a bis(trialkoxysilylorgano) polysulfide, a 3-thiocyanatopropyl trimethoxysilane, or the like, or any of the silica coupling agents that are known to those of ordinary skill in the rubber compounding art. Exemplary mercaptosilanes include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltriproxysilane, 18-mercaptooctadecyldiethoxychlorosilane, and the like. The mercaptosilane can be present in the compound in an amount of about 0.0001% to about 3% by weight, typically about 0.001% to about 1.5% by weight, and especially about 0.01% to about 1% by weight, based on the weight of the silica. Exemplary bis(trialkoxysilylorgano) polysulfide silica coupling agents include, but are not limited to, bis(3-triethoxysilyl-propyl) tetrasulfide (TESPT), which is sold commercially under the tradename Si69 by Degussa Inc., New York, N.Y., and bis(3-triethoxysilylpropyl) disulfide (TESPD) or Si75, available from Degussa, or Silquest® A1589, available from Crompton. The polysulfide organosilane silica coupling agent can be present in an amount of about 0.01% to about 20% by weight, based on the weight of the silica, preferably about 0.1% to about 15% by weight, and especially about 1% to about 10%.

The vulcanizable elastomeric compositions are compounded or blended by using mixing equipment and procedures conventionally employed in the art, such as mixing the various vulcanizable polymer(s) with reinforcing fillers and commonly used additive materials such as, but not limited to, curing agents, activators, retarders and accelerators; processing additives, such as oils; resins, including tackifying resins; plasticizers; pigments; additional fillers; fatty acid; zinc oxide; waxes; antioxidants; antiozonants; peptizing agents; and the like. As known to those skilled in the art, the additives mentioned above are selected and commonly used in conventional amounts.

Preferably, an initial master batch is prepared that includes the rubber component and the reinforcing fillers, as well as other optional non-curative additives, such as processing oil, antioxidants, and the like. After the master batch is prepared, one or more optional remill stages can follow in which either no ingredients are added to the first mixture, or the remainder of the non-curing ingredients are added, in order to reduce the compound viscosity and improve the dispersion of the reinforcing filler. The final step of the mixing process is the addition of vulcanizing agents to the mixture.

According to the embodiments of this invention, it is preferred to add the PVA during preparation of the master batch. Adding the PVA at this initial stage provides the advantage that the number of subsequent mixing stages can be reduced without compromising the processability of the compound, resulting in lowering of the cost of operation and increasing plant productivity. However, the PVA alternatively can be added during subsequent stages, including the remill stage(s) and/or the final stage, and still provide the desired processability of the compound, as well as the favorable mechanical and viscoelastic properties, including improved tear strength and modulus of the final rubber compound.

The vulcanizable composition can then be processed according to ordinary tire manufacturing techniques. Likewise, the tires are ultimately fabricated by using standard rubber curing techniques. For further explanation of rubber compounding and the additives conventionally employed, one can refer to *The Compounding and Vulcanization of Rubber*, by Stevens in Rubber Technology, Second Edition (1973 Van Nostrand Reibold Company), which is incorporated herein by reference. The reinforced rubber compounds can be cured in a conventional manner with known vulcanizing agents at about 0.1 to 10 phr. For a general disclosure of suitable vulcanizing agents, one can refer to Kirk-Othmer, *Encyclopedia of Chemical Technology*, 3rd ed., Wiley Interscience, N.Y. 1982, Vol. 20, pp. 365 to 468, particularly *Vulcanization Agents and Auxiliary Materials*, pp. 390 to 402, or Vulcanization by A. Y. Coran, *Encyclopedia of Polymer Science and Engineering*, Second Edition (1989 John Wiley & Sons, Inc.), both of which are incorporated herein by reference. Vulcanizing agents can be used alone or in combination. Preferably, the rubber compounds are sulfur-vulcanized. Cured or crosslinked polymers will be referred to as vulcanizates for purposes of this disclosure.

The vulcanizable elastomeric compositions of the present invention can be utilized to form treadstocks for tires. Pneumatic tires can be made according to the constructions disclosed in U.S. Pat. Nos. 5,866,171; 5,876,527; 5,931,211; and 5,971,046, the disclosures of which are incorporated herein by reference. The composition can also be used to form other elastomeric tire components such as subtreads, black sidewalls, body ply skims, bead fillers and the like.

In addition to the advantageous features of the present invention noted above, the cost of producing tires can be significantly reduced by employing the formulations according to the present invention. Because PVA is added to tire formulations or recipes without deleteriously impacting the ultimate properties of the tires, the use of this additive yields significant cost savings.

EXAMPLES

The following examples illustrate methods of preparation of the compounds of the present invention. However, the examples are not intended to be limiting, as other methods for preparing these compounds and different compounding formulations may be determined by those skilled in the art without departing from the scope of the invention herein disclosed and described.

Example 1

Four stocks of rubber were prepared using the formulations and mixing conditions shown in Tables 1 and 2. As shown in Table 3, control stocks A and B were compounded without the addition of PVA. Example stocks 1 and 2 were compounded with the addition of 2 phr of PVA in the master batch. The PVA, purchased from Aldrich Chemical Co., had a weight average molecular weight of 140,000 and was used without further purification.

Example 1 and control A stocks were compounded in a 4-stage mixing process, i.e., master batch stage (MB), remill 1 (R1), remill 2 (R2) and final stage (F). Example 2 and control B stocks were compounded in a 3-stage mixing process, i.e., MB, R1 and F. The final stocks were sheeted and subsequently molded at 171° C. for 15 minutes.

TABLE 1

Formulations of Stock Rubbers

| Ingredient | Amount (phr) |
| --- | --- |
| Cis-polybutadiene | 33.00 |
| Styrene-butadiene rubber* | 67.00 |
| Precipitated silica | 35.00 |
| Carbon Black | 40.00 |
| Silica coupling agent—TESPD** | 3.08 |
| Poly(vinyl acetate) | varied |
| Aromatic process oil | 18.00 |
| Wax | 1.3 |
| Antioxidant*** | 0.95 |
| Stearic acid | 1.0 |
| Zinc oxide | 1.70 |
| N-tert-butyl-2-benzothiazole sulfenamide | 1.60 |
| Benzothiazyl disulfide | 0.40 |
| Diphenyl guanidine | 0.50 |
| Sulfur | 2.3 |

*77.05 parts oil extended SBR
**bis(Triethoxysilylpropyl) disulfide
***N-(1,3-dimethylbutyl)-N'-phenyl-p-phenylene-diamine

TABLE 2

Mixing Conditions

| Mixer | 3 lb. Banbury |
| --- | --- |
| Agitation Speed | 60 rpm |
| Master Batch State (MB) | |
| Initial Temperature | 100° C. |
| 0 sec. | charging polymers |
| 30 sec. | charging 10 phr silica, poly(vinyl acetate) and all pigments |
| 2.5 min. | drop |
| Drop Temperature | 170° C. |
| Remill 1 Stage (R1) | |
| Initial Temperature | 70° C. |
| 0 sec. | charging masterbatch stock |
| 30 sec. | charging remainder of silica and TESPD |
| 2.0 min. | drop |
| Drop Temperature | 145° C. |
| Remill 2 Stage (R2) | |
| Initial Temperature | 70° C. |
| 0 sec. | charging remilled stock |
| 2.0 min. | drop |
| Drop Temperature | 145° C. |
| Final Batch Stage (F) | |
| Initial Temperature | 90° C. |
| 0 sec. | charging remilled stock |
| 30 sec. | charging curing agent and accelerators |
| Drop Temperature | 105° C. |

TABLE 3

Mixing Stages and Loading Levels of Poly(vinylacetate)

| Stock No. | Mixing Stages (No. of mixing stages) | PVA Amount (phr) |
| --- | --- | --- |
| Control A | MB, R1, R2, F (4) | 0 |
| Example 1 | MB, R1, R2, F (4) | 2 |
| Control B | MB, R1, F (3) | 0 |
| Example 2 | MB, R1, F (3) | 2 |

Example 2

The Mooney viscosities ($ML_{1+4}$) of the green stocks from each mixing stage, and the curing characteristics of each of the stocks, are shown in Table 4. The viscosity was measured at 130° C. using a large rotor, and was recorded as the torque when rotor had rotated for 4 minutes. The stocks were preheated at 130° C. for 1 minute before the rotor was started. The $t_5$ is the time required for the viscosity to increase by five Mooney units during a Mooney scorch measurement and is used as an index to predict how fast the compound viscosity will increase during processing, e.g., during extrusion. A Monsanto Rheometer MD2000 was used to characterize the stock curing process, at a frequency of 1.67 Hz and a strain of 7% at 171° C. The measurements $t_{S2}$ and $t_{90}$ are the times taken for an increase in torque of 2% and 90%, respectively, of the total torque increase during the cure characterization test. These values are useful in predicting the speed of the viscosity increase ($t_{S2}$) and the cure rate during the cure process ($t_{90}$).

TABLE 4

The Green Stock Mooney Viscosity and Curing Characteristics

| Stock No. | $ML_{1+4}$ @ 130° C. (MB) | $ML_{1+4}$ @ 130° C. (R1) | $ML_{1+4}$ @ 130° C. (R2) | $ML_{1+4}$ @ 130° C. (F.) | $t_5$ scorch @ 130° C. minutes | $t_{S2}$ @ 171° C. minutes | $t_{90}$ @ 171° C. minutes |
|---|---|---|---|---|---|---|---|
| Control A | 65.5 | 104.8 | 95.6 | 82.9 | 692 | 1.35 | 4.06 |
| Example 1 | 61.4 | 94.5 | 82.6 | 74.5 | 1017 | 1.66 | 3.27 |
| Control B | 65.1 | 101.6 | N/A | 86.7 | 637 | 1.29 | 4.12 |
| Example 2 | 57.4 | 92.1 | N/A | 80.6 | 917 | 1.61 | 3.36 |

With the addition of PVA, the compound $ML_{1+4}$ was greatly reduced at every mixing stage in example 1 and 2 stocks compared with their respective control stocks A and B. The significant reductions in $ML_{1+4}$ from 104.8 to 94.5 (control A and example 1, respectively) and from 101.6 to 92.1 (control B and example 2, respectively) in the first remill stage particularly illustrate the improved processability achieved by the use of PVA. Example 2 stock, which has added PVA and only 3 mixing stages, has a significantly lower $ML_{1+4}$ than that of the control B stock in every stage. The example 2 stock also has a lower $ML_{1+4}$ than the control A stock in every stage. Therefore, with the addition of PVA to the compounding mixture, it is possible to reduce the number of mixing stages, resulting in lowering of the cost of operation and increasing plant productivity without compromising the processability of the stocks.

The Mooney scorch time ($t_5$) and the curing scorch time ($t_{s2}$) were also significantly prolonged in the stocks containing PVA. The longer Mooney scorch time gives the stocks the advantage of a wider processing time window, especially during the extrusion process, without greatly raising the compound Mooney viscosity. The longer curing scorch time gives the stocks enough time to flow and to fill the mold better.

It was unexpected to find that the addition of PVA to the silica filled stocks significantly improved the processing of the stocks resulting in the above advantages.

Example 3

Dispersion of the silica filler was measured by the dispersion index (DI) and also by the abrasion resistance and wet skid resistance properties of the stocks. The dispersion index was evaluated using the Federal Surface System 2000 and the procedure described in the Test Method C—Microroughness Measurement in ASTM-D 2663-89. For each stock, a rectangular cured rubber approximately 3.5 cm. long, 2 cm. wide and 0.2 cm deep was obtained with a fresh razor. The surface roughness of the sample was traced by the stylus, and surface contour measurements were recorded. The dispersion index (DI) was calculated according to the following equation:

$$DI=100-\exp[A \times \log_{10}(F^2 H)+B]$$

where F is the number of roughness peaks/cm, H is the average roughness peak height, $F^2H$ is the roughness factor, and A and B are the constants 0.568225 and 1.08002, respectively, from Method B in ASTM-D 2663-89.

Wet traction of the rubber stocks was evaluated using the British Portable Skid Tester (BPST) according to ASTM E-303, Vol. 04.03.

The wear resistance of the stock samples was evaluated by the Lambourn test. The wear index was obtained from the ratio of the weight loss of the control sample to that of the test sample. Samples with higher wear indices have better wear resistance properties. The samples used for the Lambourn test were circular donuts having approximate inside and outside diameters of 0.9 and 1.9 inches, respectively, and a thickness of 0.195 inches. The samples were placed on an axle and run at a slip ratio of 25% against a driven abrasive surface.

The results of the dispersion index, wet skid test and abrasion index are given in Table 5. With the addition of PVA, the filler dispersion of the example 1 stock was improved by about 8% and about 10% compared to the dispersion in control A and control B, respectively. The filler dispersion of the example 2 stock was improved over control B and approximately equivalent to that of control A. The wet skid resistance and abrasion resistance of each of the example stocks were approximately equivalent to the those of the control stocks.

TABLE 5

Dispersion Index (DI), Wet Skid Resistance (BPST) and Abrasion Resistance

| Stock No. | DI | BPST | Abrasion Resistance |
|---|---|---|---|
| Control A | 82.4 | 64 | 100 |
| Example 1 | 88.8 | 64 | 99 |
| Control B | 80.0 | 63 | 101 |
| Example 2 | 82.6 | 65 | 99 |

Example 4

The tensile mechanical properties of each of the stocks were measured at 25° C. and 100° C. according to the standard procedure described in ASTM-D 412, and the results are shown in Tables 6 and 7. The tensile test specimens were round rings about 0.05 inches in width and about 0.075 inches in thickness. A specific gauge length of 1.0 inches was used for the tensile test. As illustrated in the tables, the example 1 and 2 stocks showed improved modulus, strength, elongation and toughness properties at 100° C., compared with their respective control stocks.

TABLE 6

Tensile Mechanical Properties Measured at 25° C.

| Stock No. | M50 (psi) | M300 (psi) | Strength Tb (psi) | Elongation at break, Eb, % | Toughness (psi) |
|---|---|---|---|---|---|
| Control A | 241 | 1655 | 2410 | 411 | 4547 |
| Example 1 | 227 | 1496 | 2475 | 460 | 5240 |
| Control B | 239 | 1531 | 2573 | 462 | 5461 |
| Example 2 | 243 | 1553 | 2434 | 442 | 5009 |

TABLE 7

Tensile Mechanical Properties Measured at 100° C.

| Stock No. | M50 (psi) | M300 (psi) | Tear Strength Tb (psi) | Elongation at break, Eb, % | Toughness (psi) |
|---|---|---|---|---|---|
| Control A | 173 | 1065 | 1137 | 295 | 1551 |
| Example 1 | 190 | 1243 | 1350 | 323 | 2078 |
| Control B | 186 | 1160 | 1240 | 317 | 1877 |
| Example 2 | 201 | 1268 | 1382 | 326 | 2147 |

Example 5

The tear strength of the rubbers measured at 171° C. and the elongation at break data are shown in Table 8. The tear strength of the vulcanized stocks was measured according to ASTM-D 624 at 100° C. Test specimens were nicked rings 0.25 inches in width, 0.10 inches in thickness, and 44 mm and 57.5 mm in inside and outside diameters, respectively. The specimens were tested at the specific gauge length of 1.750 inches. As illustrated by the data, the addition of PVA produced an improvement in tear strength and elongation at break by about 18% in the test examples compared to the controls. These are advantageous properties for a cured rubber during release of the rubber from a hot mold during the vulcanization process.

TABLE 8

Tear Strengths of Rubbers Measured at 171° C.

| Stock No. | Tear Strength (psi) | Elongation at Break, Eb, % |
|---|---|---|
| Control A | 149 | 202 |
| Example 1 | 173 | 234 |
| Control B | 147 | 200 |
| Example 2 | 177 | 237 |

Example 6

The dynamic viscoelastic properties of the cured stocks are shown in Table 9, where the data for tan δ at 0° C. and 50° C. were obtained from temperature sweep (TS) tests conducted with a frequency of 31.4 rad/sec using 0.5% strain for temperatures ranging from −100° C. to −20° C., and 2% strain for temperatures ranging from −20° C. to 100° C. The Payne effect (ΔG') and tan δ at 5% strain data were obtained from a strain sweep (SS) test. A frequency of 3.14 rad/sec was used for the strain sweep, which was conducted at 65° C. with strain sweeping from 0.25% to 14.75%.

As illustrated in the table, the stocks having added PVA (examples 1 and 2) had values for tan δ at 0° C. and 50° C. that were satisfactory compared to those of their respective stocks (controls A and B). The value of tan δ at 0° C. can be used to predict the tire wet traction, and tan δ at 50° C. can be used to predict the rolling resistance properties of the tires. The G' at −20° C. is a predictor of tire ice and snow traction. Other properties of the example 1 and 2 stocks, such as the Payne effect which is a measure of filler microdispersion, were substantially equivalent to those of the respective control stocks. Moreover, the high temperature strain sweep results are consistent with the tan δ at 50° C. results, and indicate substantially no change in these properties with PVA is added to the stocks.

Therefore, it is apparent that the addition of the PVA to the rubber stocks does not alter the dynamic viscoelastic properties of the rubber and, thus, the wet and snow traction and rolling resistance of tires made with the stocks.

TABLE 9

Viscoelastic Properties Measured by Temperature Sweep (TS) and Strain Sweep (SS) Tests

| Stock No. | G' @ −20° C. MPa (TS) | tan δ @ 0° C. (TS) | tan δ @ 50° C. (TS) | ΔG' (G' @ .25%–G' @ 14.75%) MPa 65° C. (SS) | tan δ at 5% strain at 65° C. (SS) |
|---|---|---|---|---|---|
| Control A | 4.8 | 0.333 | 0.226 | 0.306 | 0.211 |
| Example 1 | 4.8 | 0.330 | 0.238 | 0.310 | 0.218 |
| Control B | 4.8 | 0.333 | 0.227 | 0.365 | 0.208 |
| Example 2 | 4.9 | 0.325 | 0.238 | 0.365 | 0.216 |

This written description uses examples to disclose the invention, including the best mode, and also to enable any person skilled in the art to make and use the invention. The patentable scope of the invention is defined by the claims, and can include other examples that occur to those skilled in the art. Such other examples are intended to be within the scope of the claims if they have elements that do not differ from the literal language of the claims, or if they include equivalent elements with insubstantial differences from the literal language of the claims.

We claim:

1. A process for forming a tire component comprising the steps of:
   (a) blending together an elastomer, a reinforcing filler comprising silica or a mixture thereof with carbon black, a silica dispersing aid comprising about 0.1 to about 15 phr of water-insoluble poly(vinyl acetate), a silica coupling agent, and a cure agent, to form a tire compound;
   (b) fabricating the tire compound into a tire component; and
   (c) vulcanizing the tire compound;
   wherein the blending comprises a masterbatch stage, a remill stage, and a final stage; and
   either: (1) a portion of the silica is added in a different stage than the silica dispersing aid; or (2) the polyvinyl acetate is added in the masterbatch stage, and the compound has a $ML_{1+4}$ viscosity that was reduced at each mixing stage compared to the $ML_{1+4}$ viscosity of a control compound that does not include polyvinyl acetate.

2. A process for forming a vulcanized rubber compound comprising the steps of:
   (a) blending together in a first mixing step an elastomer, a reinforcing filler comprising silica or a mixture thereof with carbon black, and a silica dispersing aid comprising about 0.1 to about 15 phr of water-insoluble poly(vinyl acetate), to form a first mixture;
(b) mixing a silica coupling agent with the first mixture;
(c) mixing a cure agent with the mixture obtained in step (b);
wherein no further mixing steps are required to form a vulcanizable rubber compound that demonstrates improved filler dispersion and reduced filler flocculation compared with a vulcanizable rubber compound containing the silica coupling agent and no poly(vinyl acetate);

wherein the blending comprises a masterbatch stage, a remill stage, and a final stage;

wherein a portion of the silica is added in a different stage than the silica dispersing aid.

3. A process for forming a vulcanized rubber compound comprising the steps of:
(a) blending together in a first mixing step an elastomer, a reinforcing filler comprising silica or a mixture thereof with carbon black, and a silica dispersing aid comprising about 0.1 to about 15 phr of water-insoluble poly(vinyl acetate), to form a first mixture;
(b) mixing a silica coupling agent with the first mixture;
(c) mixing a cure agent with the mixture obtained in step (b);
wherein no further mixing steps are required to form a vulcanizable rubber compound that demonstrates improved filler dispersion and reduced filler flocculation compared with a vulcanizable rubber compound containing the silica coupling agent and no poly(vinyl acetate)

wherein the blending comprises a masterbatch stage, a remill stage, and a final stage;

wherein the polyvinyl acetate is added in the masterbatch stage, and the compound has a $ML_{1+4}$ viscosity that was reduced at each mixing stage compared to the $ML_{1+4}$ viscosity of a control compound that does not include polyvinyl acetate.

* * * * *